E. H. SCHOFIELD, DEC'D.
E. H. SCHOFIELD, ADMINISTRATOR.
COTTON PICKING NOZZLE OR TUBE.
APPLICATION FILED SEPT. 17, 1908.
1,090,347.
Patented Mar. 17, 1914.
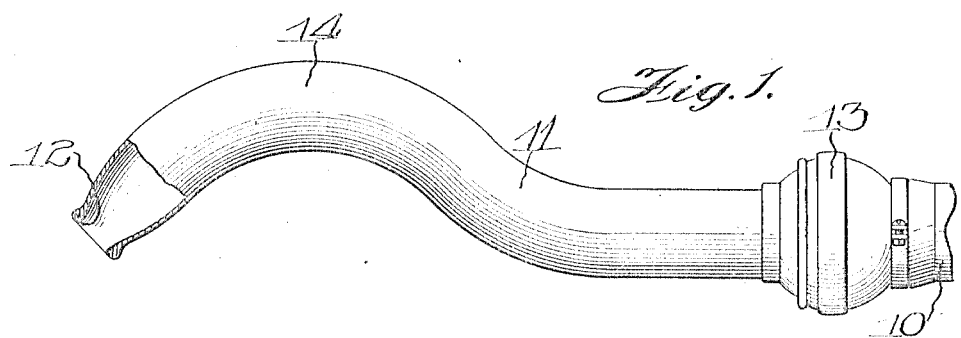
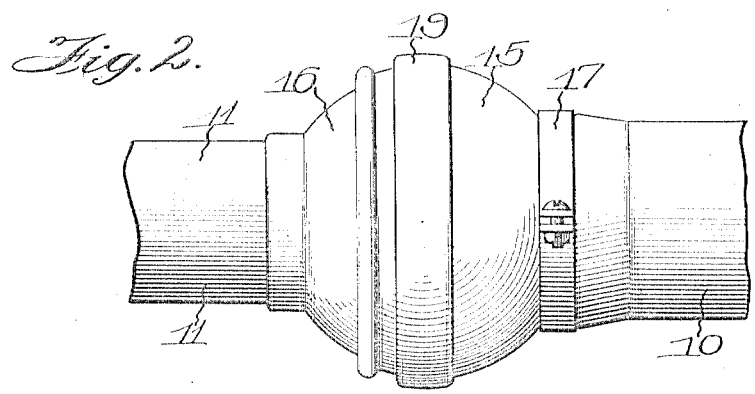
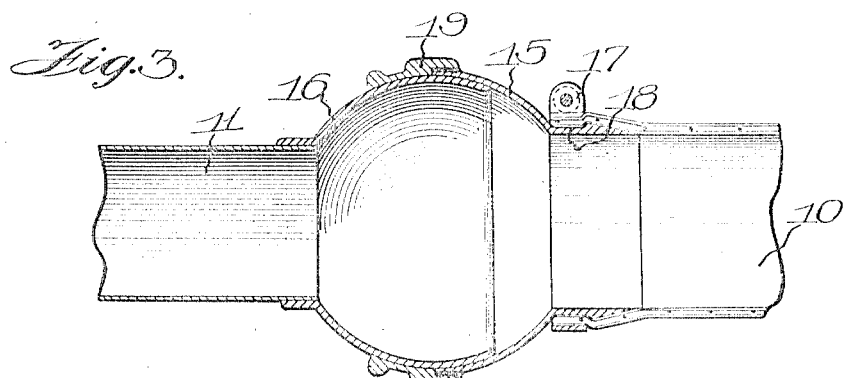

UNITED STATES PATENT OFFICE.

EUGENE H. SCHOFIELD, OF ATLANTA, GEORGIA; RAY H. SCHOFIELD ADMINISTRATOR OF SAID EUGENE H. SCHOFIELD, DECEASED.

COTTON-PICKING NOZZLE OR TUBE.

1,090,347.

Specification of Letters Patent. Patented Mar. 17, 1914.

Application filed September 17, 1908. Serial No. 453,428.

*To all whom it may concern:*

Be it known that I, EUGENE H. SCHOFIELD, a citizen of the United States, residing at Atlanta, in the county of Fulton and State of Georgia, have invented certain new and useful Improvements in Cotton-Picking Nozzles or Tubes, of which the following is a specification.

This invention relates to that class of cotton picking machines depending for their picking action upon the influence of external atmospheric pressure when a partial vacuum is created within a picking tube or passage held contiguous to the cotton boll to be picked, thus causing the boll to follow along within such passage or tube into a collecting chamber or receptacle; and the invention has for one of its objects to provide an improved and efficient picking tube of this character having perfect freedom of movement and capable, by the aid of such partial vacuum, of picking or detaching the cotton boll and conveying the same away from the plant without danger of becoming clogged by bolls of unusual size.

A further object is to provide an improved form of picking tube or nozzle.

To the attainment of these ends and the accomplishment of other new and useful objects, as will appear, the invention consists in the features of novelty in the construction, combination and arrangement of the several parts hereinafter more fully described and claimed and shown in the accompanying drawing, illustrating an exemplification of the invention, and in which—

Figure 1 is an elevation, partly in section, of this improved form of picking tube or nozzle. Fig. 2 is an enlarged detail elevation of the universal joint between the picking nozzle and tube. Fig. 3 is a detail sectional view of Fig. 2.

In reducing the invention to practice there is employed a suitable conduit 10, and in order that this conduit may be handled or operated by a person, and manipulated with freedom, it is preferably composed of flexible material such as india rubber or the like and is so constructed as to be impervious and noncollapsible. The object of this flexible conduit is to enable the operator handling the same to apply its end to the cotton boll and cause the same to be detached and conveyed away from the plant to any desired point, but these conduits in themselves are not sufficient for the accomplishment of this end, inasmuch as the inlet ends would become clogged by the cotton bolls, or if the opening in the end thereof was of a sufficient size to avoid clogging, the adjacent trash as well as the cotton would be drawn into the conduit and moreover, it would be difficult with such a flexible tube to transfer its end from one boll to another with sufficient rapidity to make the employment of such devices profitable. The conduit, therefore, is provided with a picking tube or nozzle 11 illustrated in Fig. 1 and which comprises a rigid or comparatively rigid tubular body portion, a mouth piece 12 and a joint designated generally by the reference numeral 13 in Fig. 1, which connects the tubular portion 11 with the conduit 10. The end of the tubular portion 11 is preferably bent or curved as at 14 so that as the tubular portion is held in the hand of the operator at a point near the joint 13, the free extremity thereof will extend downwardly or outwardly like a finger in a form best adapted for insertion into the plant and bringing the mouth piece 12 squarely into contact with the boll which it is desired to pick. The inlet of the nozzle is preferably constructed so as to form a circumferential rounded lip, as shown, so as to more readily direct the cotton into the nozzle, and is preferably thicker at its inlet end than the remaining portion to resist wear.

The joint 13 is of the universal type comprising two semi-circular sections 15, 16, one of which sections is secured to the extremity of the tubular member 11 and the other section 15 is secured to the extremity of the conduit 10 preferably by means of a suitable clamp 17 engaging in a recessed portion 18 of the section 15. This clamp 17 and the means for securing the section 15 to the conduit 10 is of the ordinary and well known construction. The free extremity of the section 16 of the joint is preferably inserted within the extremity of the section 15 and a collar 19 surrounds the section 16 beyond the extremity of the section 15. This collar 19 is preferably provided with internal screw threads 20 which are adapted to engage corresponding external screw threads on the section 15 of the joint. This joint permits the requisite freedom of movement of the tube or nozzle without depending upon the flexibility of the conduit 10, which movement of the conduit would render the rapid manipulation of the nozzle in any desired manner difficult, and would also render the action of placing the mouth of the tube accurately against the bolls at divers places in the plant exceedingly uncertain.

The suction through the nozzle 11 and in the conduit 10 may be created in any desired and well known manner, not necessary to illustrate, and while the picking tubes or nozzles and the flexible conduit are of sufficient size to convey the cotton without clogging, the inlet or mouth 12 is preferably contracted or made considerably smaller, which increases and concentrates the picking force and secures a maximum of velocity and efficiency with a minimum of volume and power.

With this improved construction of nozzle it will be apparent that any desired number of these nozzles and conduits 10 may be manned by as many persons and by them rapidly applied simultaneously to the plants on both sides of the row and the nozzles may be rapidly applied to the cotton bolls. The curved shape of the nozzle or picking tube, together with the freedom of movement afforded by the universal or ball and socket joint 13 and the flexibility of the conduits 10, render it easy for the operators to reach in rapid succession all of the different positions in which the cotton bolls grow. Such rapidity of action is of the utmost importance since it takes about a hundred bolls to make a pound of cotton and with such an apparatus they must be picked one at a time, and, as a consequence, the commercial success of such a device depends upon the rapidity with which the picking tubes or nozzles can be transferred from boll to boll.

The inlet to the nozzle being smaller than the inside diameter of its body or main portion, avoids undue friction of the cotton within the nozzles and the conduits, thereby preventing clogging, and it increases the velocity of the air in the inlet to the nozzle so that when this contracted inlet is brought in contact with the loose cotton, the latter is instantly compressed within the inlet, forming a temporary closure which suddenly increases the degree of vacuum within the nozzle, and the air pressure instantly forces the cotton into the picking nozzle and on through the conduit 10 to be conveyed to any desired point. The action of the air is instantaneous so that all the operator has to do is to touch the different bolls in rapid succession thereby causing the cotton to be picked more rapidly and in a better condition than when pulled by the fingers of the operator.

In order that the invention might be fully understood, the details of the foregoing embodiment thereof have been thus described, but

What I claim as new is—

The combination with a cotton picking nozzle consisting of a rigid tubular member having a straight portion with a crook at one end and a restricted mouth opening at this end smaller than the cross-sectional area of the member, of a flexible non-collapsible tube, and an air-tight universal joint connecting the nozzle and the tube, the tubular member being of a length such that the universal joint may be disposed at the elbow of an operator with the crook of the member forming a handhold by means of which the tubular member may be freely rotated.

In testimony whereof I have signed my name to this specification, in the presence of two subscribing witnesses, on this 12th day of Sept. A. D. 1908.

EUGENE H. SCHOFIELD.

Witnesses:
G. E. FOWLE,
EDWARD R. AUSTIN.